Sept. 26, 1933.  J. Z. A. DENINSON  1,928,412
VEHICLE
Filed Jan. 14, 1930   3 Sheets-Sheet 1

INVENTOR
Jacob Z. A. Deninson
BY
Mocle & Blum
ATTORNEYS

Sept. 26, 1933.  J. Z. A. DENINSON  1,928,412

VEHICLE

Filed Jan. 14, 1930    3 Sheets-Sheet 2

INVENTOR
Jacob J. A. Deninson
BY Mocker Blum
ATTORNEYS

Sept. 26, 1933.  J. Z. A. DENINSON  1,928,412
VEHICLE
Filed Jan. 14, 1930   3 Sheets-Sheet 3

INVENTOR
Jacob Z. A. Deninson
BY
ATTORNEYS

Patented Sept. 26, 1933

1,928,412

UNITED STATES PATENT OFFICE 1,928,412

VEHICLE

Jacob Z. A. Deninson, New York, N. Y.

Application January 14, 1930. Serial No. 420,809

6 Claims. (Cl. 180—21)

My invention relates to a new and improved vehicle.

One of the objects of my invention is to provide a vehicle whose running gear consists of a single ball.

Another object of my invention is to provide a vehicle in which a single ball, which contacts with the ground directly or indirectly is used to support and carry all the other portions of the vehicle.

Another object of my invention is to provide a vehicle whose running gear comprises a single ball, while the upper part of the vehicle exerts a frictional drive upon the said ball, said upper part being automatically held in proper position.

Another object of my invention is to provide a vehicle of the above mentioned type in which the position of the upper part of the vehicle, relative to the ball, is automatically shifted through a predetermined range, in accordance with the driving force exerted by the motor.

While I have referred to the running gear of the vehicle as comprising a single ball, it is to be understood that the invention covers any other type of revoluble member upon which the vehicle is located, and that it would not be departing from the invention if a plurality of balls or the like were used.

Other objects of my invention will be set forth in the following description and drawings which illustrate a preferred embodiment thereof, it being understood that the above general statement of the objects of my invention is intended merely to generally explain the same and not to limit it in any manner.

Figure 7:
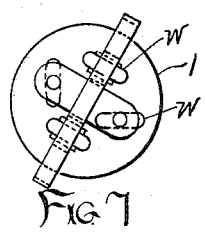
Figure 8:
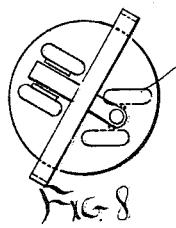
Figure 9:
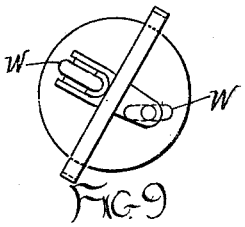

Figs. 7-9 inclusive show different types of frictional drives for the running gear.

Figure 10:
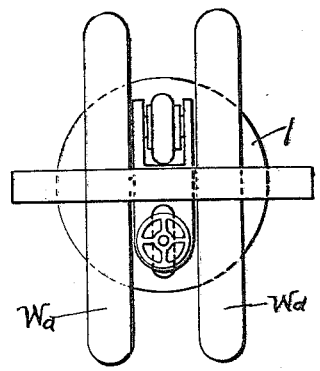

Fig. 10 illustrates a different type of running gear.

Figure 11:
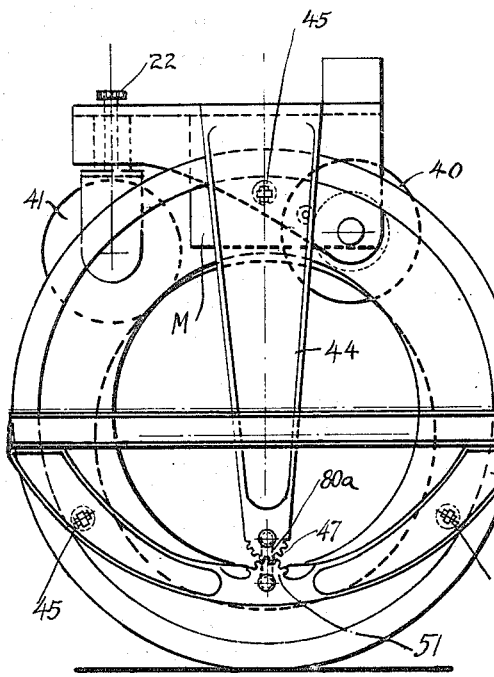

Fig. 11 is a side elevation showing another embodiment of the invention, this being the preferred type.

Figure 12:
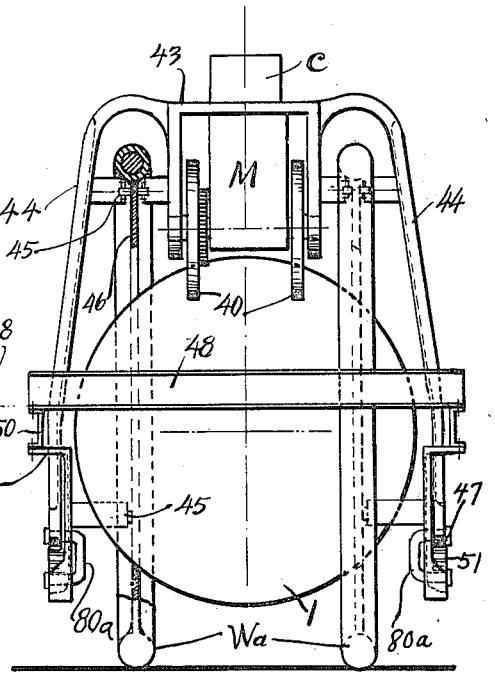

Fig. 12 is a front view of Fig. 11.

Figure 13:
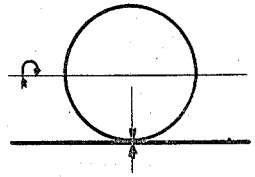

Fig. 13 is a diagrammatic view showing how the vehicle is propelled along a straight line.

Figure 14:
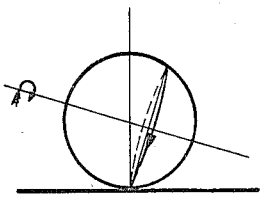

Fig. 14 is a diagrammatic view showing how the vehicle is propelled along a curved line.

Figure 15:
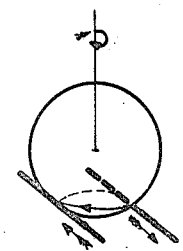

Fig. 15 diagrammatically illustrates the principle utilized in Figs. 10, 11 and 12.

Figure 16:
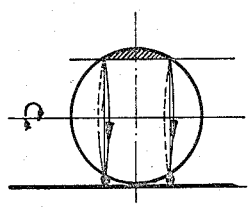

Fig. 16 diagrammatically illustrates how the vehicle illustrated in Figs. 11 and 12 is propelled along a straight line.

Figure 17:
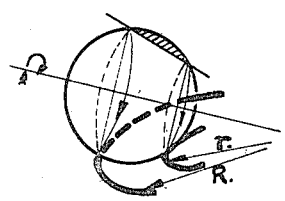

Fig. 17 diagrammatically illustrates how the vehicle shown in Figs. 11 and 12 is propelled along a curved line.

Figure 18:
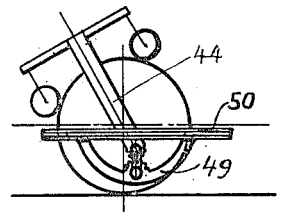

Fig. 18 shows the inclination produced in the upper part of the vehicle, when the type shown in Figs. 11 and 12 is being propelled or while it is shifted sideways due to striking an obstacle.

Figure 1:
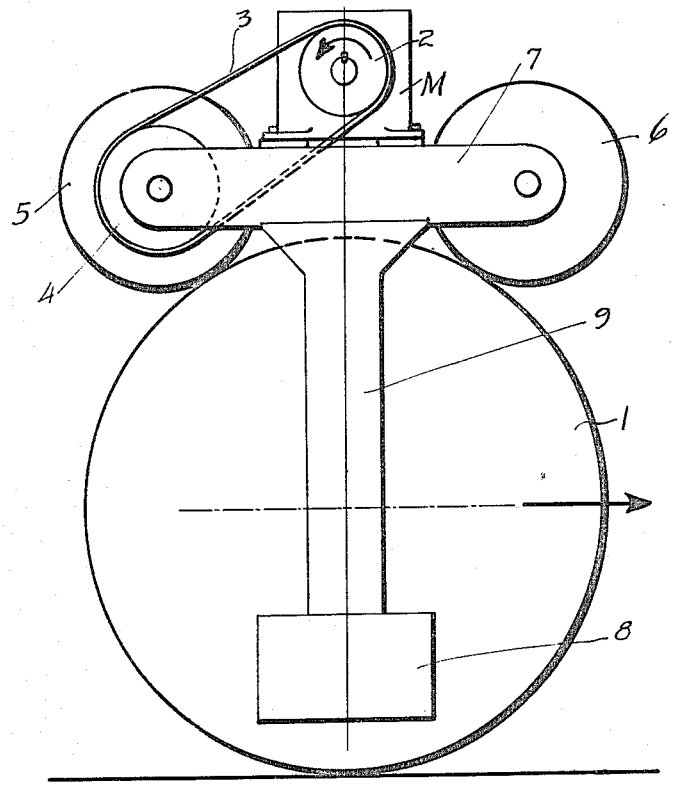
Fig. 1 is a side elevation diagrammatically illustrating the principle of the invention. The vehicle is supposed to be in the position of rest.
Figure 2:
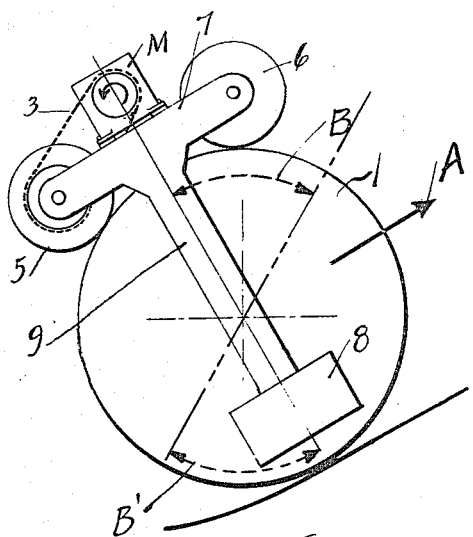
Fig. 2 is a view similar to Fig. 1 showing the vehicle in the position in which it is being propelled.

As shown in Figs. 1 and 2, the running gear of the vehicle consists of a single large ball 1 made of any suitable material, and covered with rubber or having any type of tire on the outside. This ball may be solid or hollow. The upper part of the vehicle comprises a motor M having a pulley 2, which is connected by a belt 3 to a pulley 4 on the drive wheel 5. The drive wheel 5 is connected to the idler wheel 6 by ordinary frame means 7. There may be a pair of drive wheels 5, and a pair of idler wheels 6. The number of wheels 5 and 6 may be varied. For example, there may be three such wheels.

The frame member 7 is provided with a depending weight 8, which is rigidly secured thereto. This weight could consist of the vehicle itself, or any part of the vehicle.

The weight 8 extends laterally over the periphery of the ball, and in actual practice there will be two such weights 8, one for each side of the vehicle. The wheels 5 and 6 have sufficient frictional hold upon the periphery of the ball 1, to prevent any lateral slipping.

When the motor M is actuated, the wheel or wheels 5 exert a frictional drive against the periphery of the ball 1, so that the arm 9, by means of which the weight 8 is rigidly connected to the frame 7, is shifted to the inclined position shown in Fig. 2. That is, the drive wheel or drive wheels 5 are caused to turn in the counter-clockwise direction. This causes the ball 1 to turn in the clockwise direction, thus propelling the vehicle in the direction of the arrow A, shown in Fig. 2. The inclination of the arm 9 to the vertical direction, depends upon the torque exerted by the drive wheel or drive wheels upon the ball 1. Of course, the motor M could be reversed, and a suitable gear system could be used for controlling the speed of the vehicle and the direction of movement. The arrows B and B' indicate that the weight 8 tends to oppose the action of the driving torque so that while the upper part of the vehicle is shifted to a certain extent from the top position shown in Fig. 1, this shifting is limited.

Figure 3:
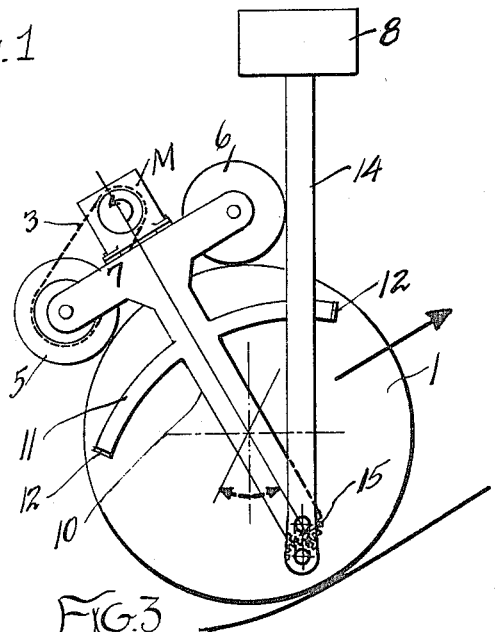
Fig. 3 is another embodiment of the invention.

In the embodiment shown in Fig. 3, the frame of the vehicle is provided with arms 10 which are similar to the arms 9. These arms 10 have integral segments 11 provided with laterally bent portions 12, which act as stops to limit the relative movement between each arm 10 and each arm 14. Each arm 14 is pivotally connected to its arm 10 by a member 15, and it is provided with a weight 8 at the top thereof.

Of course, two such arms 10 are provided, and they are laterally offset from the periphery of the ball 1. Any suitable means could be used for causing the relative movement between arms 14 and 10, which are produced by said intermeshing gear teeth.

In the embodiment shown in Fig. 3, the arm 14 is always held vertical as the undercarriage 7 is shifted, so that the weight 8 operates in the manner before described. The lateral stops 12 limit the relative movement between the arms 10 and 14. Fig. 3 is shown to illustrate how the force of gravity acting below the undercarriage 7, will automatically balance the driving torque and the accelerated useful load.

Figure 4:
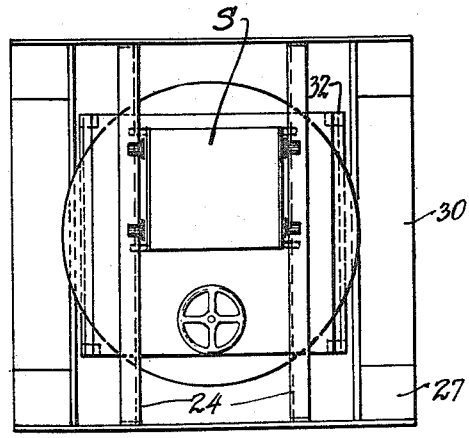
Fig. 4 is a plan view of Fig. 5.
Figure 6:
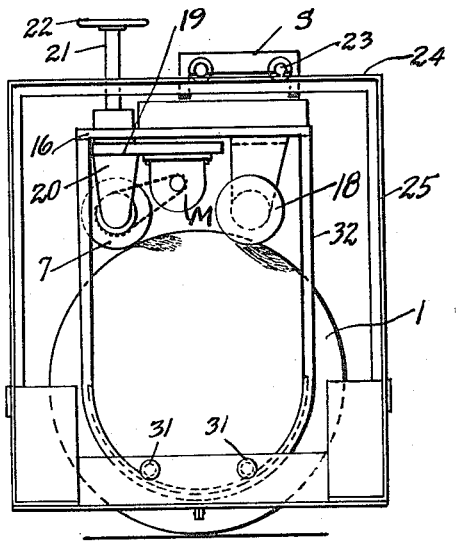
Fig. 6 is a side elevation of Fig. 5.
Figure 5:
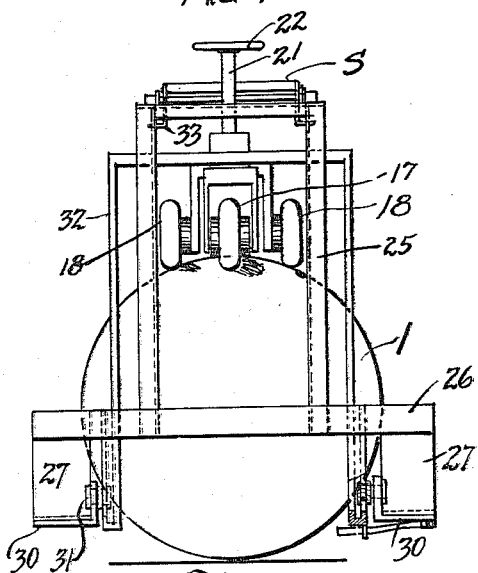
Fig. 5 is a front elevation of a third type of vehicle.

In the embodiment shown in Figs. 4, 5 and 6, the undercarriage 16 of the vehicle is provided with a frame member 32 on each side thereof. Each frame member 32 has a rounded bottom which serves as a track. The vehicle also includes a revoluble plate 19, which is controlled by the steering column 21 provided with a steering wheel 22. The motor M is mounted upon this pivoted plate 19, and the drive wheel 7 is mounted in bearings 20, which are also connected to the revoluble plate 19. The vehicle is provided with two rear idler wheels 18. The seat S is not mounted directly upon the vehicle. On the contrary, it is slidably mounted by means of rollers 23, on the top bars 24 of an outer frame 25. This outer frame 25 is provided with electric batteries 27 at the four corners thereof, and these batteries 27 serve as heavyweights, to produce the proper balance and resistance to the action of the driving torque.

The outer frame 25 is mounted upon the track portions of the inner frame 32, by means of rollers 31.

As shown in Fig. 5, the outer frame 25 is provided with a bar 26, having angular extensions 30. The operation of this embodiment is as follows:

When the drive torque is exerted, the vehicle tends to move to the left of the position shown in Fig. 6. This tends to tilt the inner frame 32 in the counter-clockwise direction, from the position shown in Fig. 6. In the position shown in Fig. 6, the rollers 31 are symmetrically disposed with respect to the central vertical axis of the frame. However, if the frame 32 is tilted, the rollers 31 are moved to the left of the position shown in Fig. 6, so that the effective weight imposed upon the frame 25 by the weights 27, now operates in the same manner as the weight 8 shown in Fig. 2, to resist further tilting of the frame 32. However, the frame 25 is merely shifted horizontally and without tilting, so that the seat S remains perfectly horizontal. The seat S is prevented from rising with respect to the vehicle by means of hooks 33.

In the embodiment shown in Fig. 7, there are four wheels W connected to the carriage. The embodiment shown in Fig. 8 also has four wheels, the steering being accomplished in a different manner.

In the embodiment shown in Fig. 9, there are two such wheels W. In the embodiment shown in Fig. 10, the device is provided with two large outer wheels $W^a$ and $W^d$ $x$, similar to ordinary automobile wheels, and the ball 1 is mounted within such wheels, as illustrated in greater detail in Figs. 11 and 12.

As shown in Fig. 13, if the ball travels in a straight line, it travels on a great circle thereof. As shown in Fig. 14, if the ball is moved in a curved path, then it moves on a small circle thereof.

As shown in Figs. 11 and 12, the running gear of the vehicle may comprise two ordinary wheels $W^a$, which may be similar in construction to automobile wheels, save that they are without spokes, so that the ball 1 can project through said wheels W. The vehicle can have any suitable number of wheels which contact with the ball 1, three such wheels being illustrated herein, as in the embodiment shown in Figs. 4-6.

The motor M is provided with the ordinary control box C and the motor M drives the two front wheels 40. The rear wheel 41 is provided with a steering wheel 22. The frame 43 is provided with depending arms 44. Likewise, the arms 44 and the frame are provided with rollers 45 which bear against the flanges 46 of the wheels $W^a$, so as to keep the parts in proper relative position. The arms 44 terminate in gear portions 47.

A square horizontal frame 48 supports the weight of the upper part of the vehicle. This square frame 48 surrounds the arms 44. The frame 48 is provided with yokes 49 connected thereto by means of angle bars 50 so that the yokes 49 are rigidly connected to the frame 48. The yokes 49 are provided with gear portions 51, which mesh with the gear portions 47 of the arms 44. The drawings do not show the upper frame or structure which carries the useful load, but this detail can be readily seen from Fig. 6 for example.

According to this embodiment, when the drive torque is imposed upon the drive wheels 40, the arms 44 are tilted in the counter-clockwise direction. This tends to shift the yokes 49 together with the frame 48 to the right, as illustrated in Fig. 18. However, the frame 48 is not tilted, but it is only shifted horizontally so that the useful load carried on the frame 48 is merely shifted horizontally without any tilting.

When the frame 48 is shifted, the force of gravity resulting from the weight or weights which are connected to said frame 48, resist the further tilting movement of the arms 44 thus establishing a balance or equilibrium.

The ball 1 has sufficient frictional hold upon the flanges 46, to cause the wheels $W^a$ to turn, in order to propel the vehicle.

I wish to make it clear that the drawings only diagrammatically illustrate the principle of the invention, as all the well known mechanical details, such as springs, etc., have been omitted.

For example, instead of using a friction drive, an ordinary gear drive or the like could be utilized.

Since the motor is caused to propel a wheel or wheels which follow the periphery of the ball, the effect is the same as though the arm or arms depending from the vehicle were pivoted on the central axis of the ball.

In order to conveniently designate the parts for the purposes of the claims, that portion of the device which includes the drive wheel or drive wheels, may be designated as the "driven portion" of the vehicle. While I have shown the vehicle mounted upon a ball, it is not necessary that the vehicle should be mounted on a support having a spherical shape. It is clear that the invention would operate if the vehicle was mounted upon a supporting member having a round surface. Indeed it is not absolutely necessary that this round supporting surface should be of circular contour.

As shown in Fig. 12, the members 47 and 51 have their centers of revolution connected by hook devices 80a. Hence, the load carrying frame 48 depends from the arms 44, by means of hooks 80 or any similar device.

I have shown a preferred embodiment of my invention, but it is clear that numerous changes and omissions can be made without departing from its spirit.

I claim:

1. A motor driven vehicle comprising a driven portion located upon the surface of a ball, said driven portion having a weight connected thereto and adapted to resist a relative displacement between said driven portion and said ball which is produced by the driving force.

2. A motor driven vehicle comprising a driven portion located upon the surface of a ball, said driven portion having depending arms and a weighted frame which is tiltable with respect to said arms, said weighted frame being adapted to resist the tilting movement of said arms which is produced by the driving force.

3. A vehicle comprising a pair of main wheels adapted to contact with the ground, said wheels having annular flanges, a ball resting upon said annular flanges, a driven portion of said vehicle resting upon said ball, means adapted to maintain said driven portion in proper relative position with respect to said flanges, arms depending from said rigid portion, and a weighted frame depending from said arms and turnably connected thereto so that the tilting of said arms causes a lateral shifting of said weighted frame, and a resulting counter-force to resist the tilting of said arms under the influence of the driving force.

4. A motor driven vehicle comprising a driven portion located upon the round surface of a supporting member, said vehicle having a portion thereof located below the center of said supporting member, so that said portion of said vehicle constitutes a weight which is adapted to resist a relative displacement between said driven portion and said supporting member, which is produced by the driving force.

5. A motor driven vehicle comprising a driven portion located upon the round surface of a supporting member, said driven portion having a weighted frame connected thereto below it, said frame being tiltable with respect to said driven portion, so that it tilts when the driving force is exerted on said driven portion, so that gravity will produce a counter-force adapted to resist the displacement produced by the driving force between said driven portion and said supporting member.

6. A vehicle comprising running gear adapted to contact with the ground and to support a frame, driving means connected to said frame and contacting with a round surface of said running gear, a motor adapted to actuate said drive means so that the turning of said drive means actuate said running gear and causes the vehicle to move, said frame being tiltably mounted and having a portion which is offset from the center of gravity of said running gear, so that when said frame is tilted by the actuation of said drive means, the force of gravity can resist the relative displacement between said frame and said running gear.

JACOB Z. A. DENINSON.